(12) United States Patent
Fukuda et al.

(10) Patent No.: US 10,151,241 B2
(45) Date of Patent: Dec. 11, 2018

(54) SEALING MECHANISM FOR A REGENERATIVE GAS TURBINE COMBUSTOR

(71) Applicant: Mitsubishi Hitachi Power Systems, Ltd., Yokohama, Kanagawa (JP)

(72) Inventors: Tatsuya Fukuda, Yokohama (JP); Yasuyuki Watanabe, Yokohama (JP); Hironori Tsukidate, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 856 days.

(21) Appl. No.: 14/282,170

(22) Filed: May 20, 2014

(65) Prior Publication Data

US 2014/0345249 A1 Nov. 27, 2014

(30) Foreign Application Priority Data

May 21, 2013 (JP) ................................. 2013-107252

(51) Int. Cl.
*F02C 7/10* (2006.01)
*F02C 7/08* (2006.01)
(Continued)

(52) U.S. Cl.
CPC ................ *F02C 7/10* (2013.01); *F01D 9/023* (2013.01); *F02C 7/08* (2013.01); *F23R 3/04* (2013.01);
(Continued)

(58) Field of Classification Search
CPC ...... F02C 7/08; F02C 7/10; F02C 7/20; F23R 3/04; F23R 3/60; F23R 2900/00012; F16J 15/44; F16J 15/441
See application file for complete search history.

(56) References Cited

U.S. PATENT DOCUMENTS 5,333,443 A * 8/1994 Halila ..................... F23R 3/002
60/752
5,490,445 A * 2/1996 Rao ............................ F16J 1/08
123/193.6
(Continued)

FOREIGN PATENT DOCUMENTS

DE 1426325 1/1969
EP 2 128 524 A1 12/2009
(Continued)

OTHER PUBLICATIONS

Japanese-language Office Action issued in counterpart Japanese Application No. JP 2013-107252 dated Feb. 28, 2017 (seven (7) pages).

(Continued)

*Primary Examiner* — Todd E Manahan
*Assistant Examiner* — Eric Linderman
(74) *Attorney, Agent, or Firm* — Crowell & Moring LLP

(57) ABSTRACT

A regenerative gas turbine combustor is provided that enable to reduce an amount of leakage of compressed air before preheating to compressed air after the preheating.
The regenerative gas turbine combustor is such that a compressed air passage between a combustor inner cylinder 10 and a tail cylinder 12, and a combustor outer cylinder 7 is blocked by a division wall 15 at a position between a bleeding port 13 and an injection port 14, and compressed air is preheated in a regenerator 4 and then the compressed air thus preheated is burnt together with fuel. This combustor includes seal rings 17a-17c, a holder 16 installed on the inner circumferential portion of the division wall 15 and having ring grooves 25a-25c for holding the respective seal rings 17a-17c, and gaps 20 provided between the inner circumferential surfaces of the ring grooves 25a-25c and the outer circumferential surfaces of the seal rings 17a-17c.

3 Claims, 5 Drawing Sheets

(51) Int. Cl.
*F23R 3/04* (2006.01)
*F23R 3/60* (2006.01)
*F01D 9/02* (2006.01)
*F16J 15/44* (2006.01)

(52) U.S. Cl.
CPC ............ *F23R 3/60* (2013.01); *F05D 2240/57* (2013.01); *F05D 2240/581* (2013.01); *F16J 15/44* (2013.01); *F16J 15/441* (2013.01); *F23R 2900/00012* (2013.01)

(56) References Cited

U.S. PATENT DOCUMENTS

| | | | | |
|---|---|---|---|---|
| 6,199,868 B1* | 3/2001 | Evans | ........................ | F16J 9/06 277/467 |
| 6,865,893 B2* | 3/2005 | Koganezawa | ........... | F02C 3/04 29/889.21 |
| 6,895,757 B2* | 5/2005 | Mitchell | ............... | F01D 11/005 60/753 |
| 7,237,389 B2* | 7/2007 | Ryan | ........................ | F23R 3/007 60/753 |
| 7,987,678 B2* | 8/2011 | Maurell | .................. | F01D 9/023 60/796 |
| 8,141,370 B2* | 3/2012 | Bulman | .................... | F02C 3/14 60/752 |
| 8,267,062 B2* | 9/2012 | Chipperfield | ............. | B60T 1/10 123/193.6 |
| 8,388,307 B2* | 3/2013 | Smoke | ..................... | F01D 9/02 415/134 |
| 8,429,916 B2* | 4/2013 | Rudrapatna | ............. | F23R 3/002 277/641 |
| 8,459,041 B2* | 6/2013 | Flanagan | ................. | F01D 9/023 60/752 |
| 8,534,076 B2* | 9/2013 | Woodcock | .............. | F01D 9/023 415/138 |
| 9,016,066 B2* | 4/2015 | Wiebe | ...................... | F23R 3/002 60/746 |
| 9,051,882 B2* | 6/2015 | Copeland | ................. | F02C 7/28 |
| 2001/0045700 A1* | 11/2001 | Russell | .................. | F16J 15/028 277/347 |
| 2005/0058537 A1 | 3/2005 | Corman et al. | | |
| 2005/0189725 A1 | 9/2005 | Edwards | | |
| 2008/0098884 A1* | 5/2008 | Varanasi | ................. | F16J 9/06 92/165 R |
| 2009/0288422 A1* | 11/2009 | Cernay | ..................... | F23R 3/60 60/800 |

FOREIGN PATENT DOCUMENTS

| | | |
|---|---|---|
| GB | 2464467 A | 4/2010 |
| JP | 49-43216 A | 8/1972 |
| JP | 54-38258 B2 | 11/1979 |
| JP | 2-55839 A | 2/1990 |
| JP | 9-324793 A | 12/1997 |
| JP | 2002-327626 A | 11/2002 |
| JP | 2003-65071 A | 3/2003 |
| JP | 2004-176911 A | 6/2004 |
| JP | 2006-220350 A | 8/2006 |
| JP | 2007-525625 A | 9/2007 |

OTHER PUBLICATIONS

Extended European Search Report dated Aug. 5, 2014 (Six (6) pages).

* cited by examiner

SEALING MECHANISM FOR A REGENERATIVE GAS TURBINE COMBUSTOR

BACKGROUND OF THE INVENTION

1. Field of the Invention

The present invention relates to a regenerative gas turbine combustor.

2. Description of the Related Art

A combustor is known in which compressed air generated by a compressor is preheated by the exhaust gas from a turbine and then burned together with fuel so as to reduce fuel supply, thereby improving thermal efficiency. Such a combustor is hereinafter called a regenerative gas turbine combustor. The regenerative gas turbine combustor suffers from a decrease in combustion efficiency if compressed air before preheating flows into a combustion chamber of the turbine combustor. Therefore, a division wall is provided to block an annular passage located between a combustor outer cylinder (a casing) and a combustor inner cylinder (a liner) and allowing compressed air to flow therein. Thus the compressed air before preheating is isolated from the compressed air after the preheating. This division wall is usually installed on the inner circumferential surface of the combustor outer cylinder and extends from the combustor inner cylinder to a tail cylinder which leads combustion gas to the turbine. A clearance between the division wall and the tail cylinder is sealed by a sealing mechanism which uses e.g. a leaf spring (see JP-2006-220350-A).

SUMMARY OF THE INVENTION

However, the sealing mechanism which uses the leaf spring does not always produce a sufficient effect because of the certain reasons in assembling the combustor. Specifically, in some cases the leakage of compressed air before preheating to compressed air after the preheating cannot sufficiently be suppressed.

It is an object of the present invention to provide a regenerative gas turbine combustor that enables to reduce an amount of leakage of compressed air before preheating to compressed air after the preheating.

According to an aspect of the present invention, there is provided a regenerative gas turbine combustor, comprising: a combustor inner cylinder internally defining a combustion chamber; a tail cylinder connecting the combustor inner cylinder with a turbine; a combustor outer cylinder surrounding the combustor inner cylinder and the tail cylinder; a fuel nozzle for supplying fuel to the combustion chamber; a bleeding port provided in the combustor outer cylinder; a regenerator for preheating, by using the exhaust gas from the turbine, compressed air bled from the bleeding port; an injection port for injecting the compressed air preheated by the regenerator into the inside of the combustor outer cylinder; a division wall for blocking a compressed-air passage located between the combustor inner cylinder and the tail cylinder, and the combustor outer cylinder, at a position between the bleeding port and the injection port; and a sealing mechanism for sealing a clearance between the tail cylinder or the combustor inner cylinder and the division wall; wherein the sealing mechanism includes a seal ring, a holder installed on an inner circumferential portion of the division wall and having a ring groove for holding the seal ring, and a gap provided between an inner circumferential surface of the ring groove and an outer circumferential surface of the seal ring.

The present invention can reduce an amount of leakage of compressed air before the preheating to the compressed air after the preheating.

DESCRIPTION OF THE PREFERRED EMBODIMENTS

Preferred embodiments of the present invention will hereinafter be described with reference to the drawings.

First Embodiment

1. Gas Turbine

Figure 1:
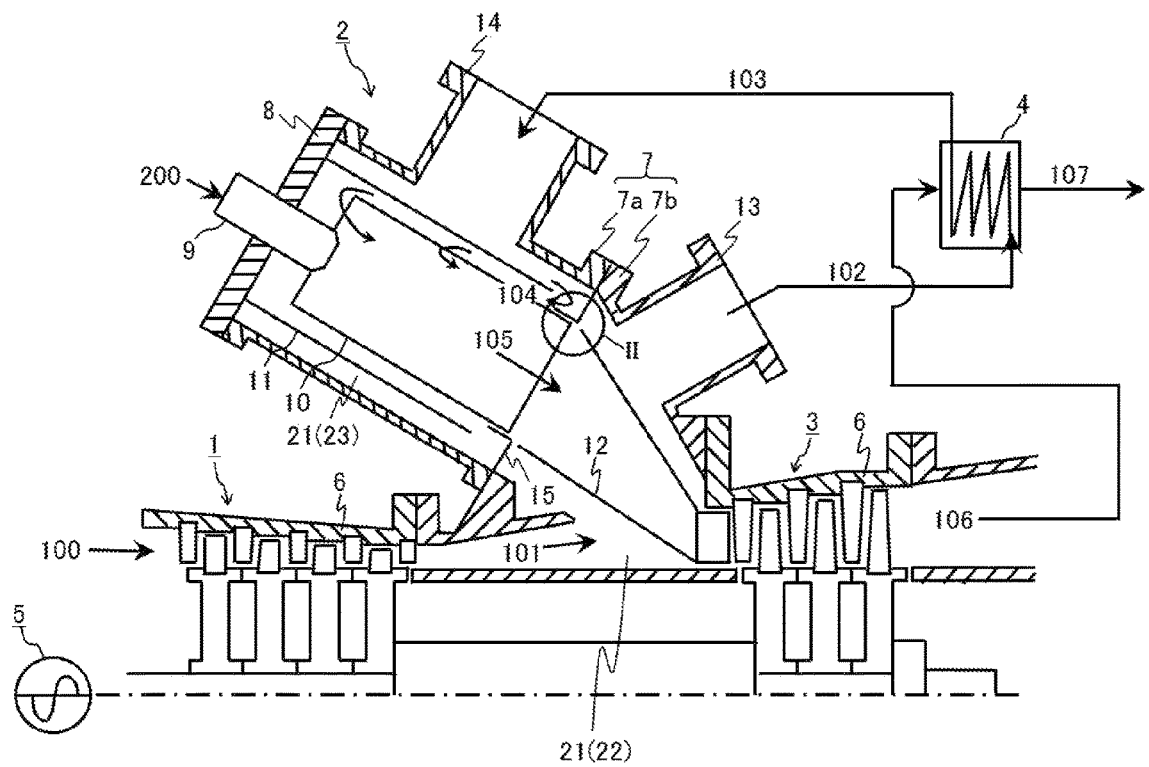
FIG. 1 is a side cross-sectional view of a gas turbine to which a regenerative gas turbine combustor according to the present invention is applied.

FIG. 1 is a lateral cross-sectional view of a gas turbine to which a regenerative gas turbine combustor according to an embodiment of the present invention is applied.

The gas turbine illustrated in FIG. 1 includes a compressor 1, a combustor 2 and a turbine 3. In the gas turbine, the compressor 1 compresses air 100 to generate compressed air 101, the combustor 2 burns fuel 200 together with the compressed air 103, and combustion gas 105 from the combustor 2 drives the turbine 3. The compressor 1 and the turbine 3 are coaxially connected to the generator 5. The output of the turbine 3 rotates the generator 5 to generate electric power. In FIG. 1, the generator 5 is connected to the side of the compressor 1; however, it is connected to the side of the turbine 3 in some cases.

2. Combustor

The combustor 2 is a regenerative gas turbine combustor, which preheats the compressed air 102 from the compressor 1 and burns it together with fuel. FIG. 1 illustrates only one gas turbine combustor; however, a plurality of the gas turbine combustors are circumferentially installed on the outer circumferential portion of a main body casing 6 of the gas turbine (i.e., the multi can-type combustor). Each combustor 2 includes a combustor inner cylinder (a combustor liner) 10, a tail cylinder (an impingement sleeve) 12, a combustor outer cylinder (a combustor casing) 7, a division wall 15, a bleeding port 13, a regenerator 4, an injection port 14 and a fuel nozzle 9.

The combustor inner cylinder 10 is a cylindrical member which internally defines a combustion chamber. In addition, the combustor inner cylinder 10 plays a role of isolating high-temperature compressed air 103 (detailed later) from the combustion gas 105.

The tail cylinder 12 connects the combustor inner cylinder 10 with the turbine 3 and plays a role of leading the combustion gas 105 to the gas path of the turbine 3. The tail cylinder 12 is a cylindrical member whose cross-sectional area is gradually reduced as it gets closer to the turbine 3.

The combustor outer cylinder 7 is a cylindrical member which surrounds the combustor inner cylinder 10 and the tail cylinder 12. In addition, the combustor outer cylinder 7 includes a liner housing portion 7a which covers the outer circumferential portion of the combustor inner cylinder 10 and a tail cylinder housing portion 7b which covers the outer circumferential portion of the tail cylinder 12. The tail cylinder housing portion 7b has one end connected to the main body casing 6. The liner housing portion 7a has one end connected to the other end of the tail cylinder housing portion 7b. The tail cylinder housing portion 7b is formed integrally with that of a combustor 2 adjacent to the combustor 2. The tail cylinder housing portions 7b thus integrally formed are usually configured by a two-division including the upper-half side and lower-half side of the gas turbine. The liner housing portion 7a has the other end closed by a combustor cover 8.

The combustion nozzle 9 is adapted to inject fuel into the combustion chamber inside the combustor inner cylinder 10. Fuel injection holes are provided in the combustor cover 8 so as to face the upstream end portion of the combustor. The upstream mentioned above means upstream in the flowing direction of the combustion gas 105. The upstream and the downstream mentioned unless otherwise explained shall indicate the upstream and the downstream, respectively, in the flowing direction of the combustion gas 105.

The above-mentioned bleeding port 13 is provided on each of the tail cylinder housing portions 7b of the combustor outer cylinders 7. The injection port 14 is provided on each of the liner housing portions 7a of the combustor outer cylinders 7. The bleeding port 13 and the injection port 14 are connected to the regenerator 4. The compressed air 102 bled from the tail cylinder housing portion 7b via the bleeding port 13 is supplied to the regenerator 4. Exhaust gas from the turbine 3 is led to the regenerator 4. The compressed air 102 is subjected to heat exchange with the exhaust gas to be preheated (heated). The compressed air 103 thus preheated (heated) is injected into the liner housing portion 7a via the injection port 14.

The division wall 15 is a plate-like ring which blocks a cylindrical compressed-air passage 21 located between the combustor inner cylinder 10 and the tail cylinder 12, and the combustor outer cylinder 7 (the liner housing portion 7a and the tail cylinder housing portion 7b), at a position between the bleeding port 13 and the injection port 14. The division wall 15 divides a compressed-air passage 21 into two passages: an air passage 22 connected to the regenerator 4 via the bleeding port 13 and an air passage 23 connected to the regenerator 4 via the injection port 14. In other words, the division wall 15 isolates the compressed air 102 before being preheated by the regenerator 4 from the compressed air 103 after being preheated. The division wall 15 per se has an outer circumferential portion secured to the combustor outer cylinder 7. A clearance between the inner circumferential portion of the division wall and an opposite member (the tail cylinder 12 in the present embodiment) is sealed by a sealing mechanism (described later). The division wall 15 is located at a boundary portion between the liner housing portion 7a and the tail cylinder housing portion 7b and assembled to the tail cylinder housing portion 7b along with the liner housing portion 7a while being mounted to the liner housing portion 7a. Alternatively, it is conceivable that the division wall 15 is formed integrally with the liner housing portion 7a. The regenerator 4 may be configured to be individually prepared for each combustor 2. Alternatively, the regenerator 4 can be configured to be shared by a plurality of or all the combustors 2.

A cylindrical flow guide 11 for controlling the flow of the compressed air 103 is installed between the liner housing portion 7a of the combustor outer cylinder 7 and the combustor inner cylinder 10. This flow guide 11 having a diameter greater than that of the combustor inner cylinder 10 and smaller than that of the combustor outer cylinder 7 (the liner housing portion 7a), is a member concentric with the combustor inner cylinder 10 and is mounted to the liner housing portion 7a. The flow guide 11 has an upstream end which is in contact with the combustor cover 8 so as to be closed thereby and has the other end having an opening on a downstream side thereof. In this way, the compressed air 103 injected from the regenerator 4 is made to flow along the outer circumferential surface of the combustor inner cylinder 10 from the downstream side toward the upstream side (in the direction opposite to the flow of the combustion gas 105). The combustor inner cylinder 10 is mounted to the combustor outer cylinder 7 so that the combustor inner cylinder 10 may have an opening portion on the downstream side thereof.

3. Sealing Mechanism

Figure 2:
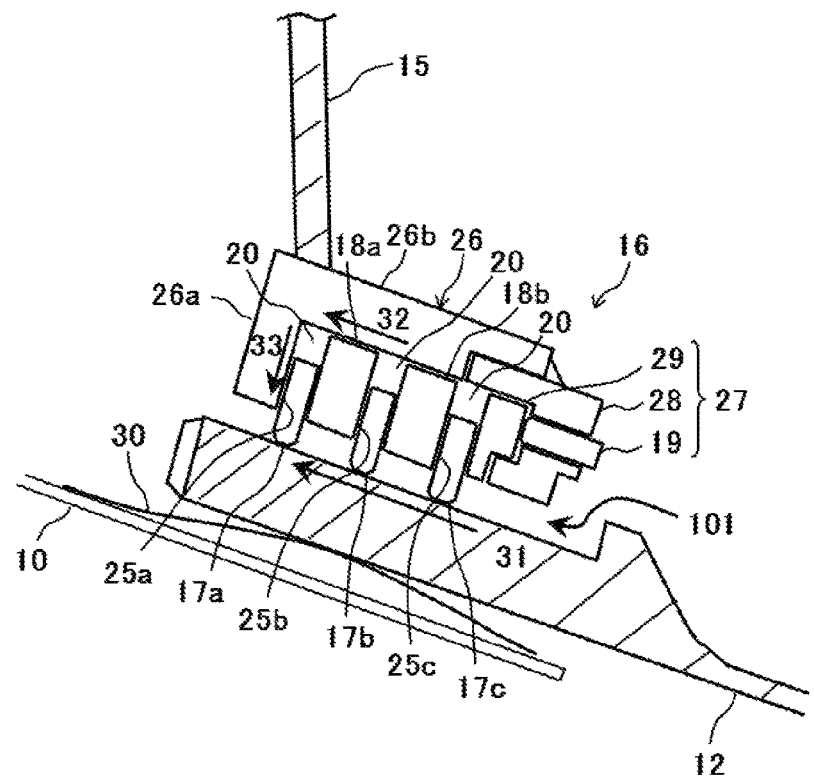
FIG. 2 is an enlarged side cross-sectional view of a II-portion in FIG. 1, illustrating a sealing mechanism according to a first embodiment of the present invention.
Figure 3:
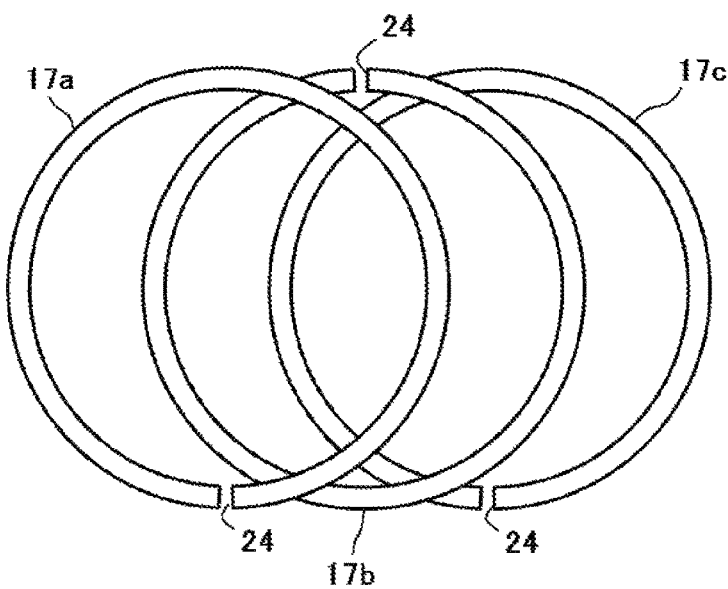
FIG. 3 is a configuration view of seal rings to be installed in the sealing mechanism in FIG. 2.

FIG. 2 is an enlarged side cross-sectional view of a II-portion in FIG. 1, illustrating the configuration of a sealing mechanism according to the first embodiment of the present invention. FIG. 3 is a configuration view of seal rings 17a-17c installed in the sealing mechanism in FIG. 2. The constitutional members that have already been described are attached with the same reference numerals as those in FIG. 1 and their explanations are omitted.

The sealing mechanism illustrated in FIGS. 2 and 3 has seal rings 17a-17c and a holder 16. The sealing mechanism permits the tail cylinder 12, which largely thermally extends toward the upstream side during the operation of the gas turbine, to move relative to the division wall 15.

The seal rings 17a-17c are in contact with the outer circumferential surface of the tail cylinder and each of them has a cut 24 (see FIG. 3) at a circumferential position thereof. The present embodiment exemplifies a case where three seal rings 17a-17c are provided in rows in the axial direction of the tail cylinder (the flow direction of the combustion gas). The three seal rings 17a-17c are attached to the holder 16 with the positions of the cuts 24 of the adjacent seal rings being circumferentially offset from each other as illustrated in FIG. 3. The offset amount of the cuts 24 is not necessarily restrictive; however, it is desirable that the positions of the cuts 24 of the axially adjacent rings be offset from each other at 180 degrees. Incidentally, when viewed in section, the seal rings 17a-17c each have a tip of which both corners are chamfered at a portion to which the tail cylinder 12 is in contact. Thus, it is hard for the end portion of the tail cylinder 12 to be caught by the seal rings 17a-17c during assembly.

The holder 16 includes a holder body 26, spacers 18a, 18b and a pressing force adjusting mechanism 27. The holder body 26 is a ring-like member having an L-shaped cross section and is provided on the inner circumferential portion of the division wall 15. In addition, the holder body 26 has a front wall portion 26a whose section extends in the radial direction of the tail cylinder and an outer circumferential wall portion 26b which extends from the outer circumferential portion of the front wall portion 26a toward the downstream side. The pressing force adjusting mechanism 27 includes a bracket 28 which is secured to the downstream end of the outer circumferential wall portion 26b of the holder body 26 by welding or the like; a pressing force adjusting bolt 19 threadedly engages with the bracket 28; and a pressing ring 29 which presses the seal ring 17c. The pressing force adjusting bolt 19 extends in the axial direction of the tail cylinder 12. The spacers 18a and 18b are ring-like members and are interposed between the corresponding seals adjacent to each other in the axial direction of the tail cylinder 12 (between the seal rings 17a and 17b, and between the seal rings 17b and 17c, respectively). In the state where the spacers 18a, 18b are held between the seal rings 17a and 17b and between 17b and 17c respectively, and the pressing ring 29 is brought into contact with the seal ring 17c, the pressing force adjusting bolt 19 is fastened to hold the seal rings 17a-17c and the spacers 18a, 18b between the pressing plate 29 and the front wall portion 26a. The pressing force of the seal rings 17a-17c and the spacers 18a, 18b is adjusted by turning the pressing force adjusting bolt 19.

In this case, ring grooves 25a, 25b and 25c which hold the seal rings 17a, 17b and 17c, respectively, are defined between front wall portion 26a of the holder body 26 and the spacer 18a, between the spacers 18a and 18b, and between the spacer 18b and the pressing ring 29, respectively. The outer diameters of the seal rings 17a-17c are set to be smaller than the inner diameter of the outer circumferential wall portion 26b of the holder body 26. Gaps 20 are ensured between the inner circumferential surfaces of the corresponding ring grooves 25a-25c, i.e., the inner circumferential surface of the outer circumferential wall portion 26b and the outer circumferential surfaces of the seal rings 17a-17c. The outer circumferential wall portion 26b protrudes from the division wall 15 toward the downstream side (the bleeding port 13 side), so that the outer circumferential surface of the outer circumferential wall portion 26b mainly receives the pressure of the compressed air 101. In short, the outer circumferential surface of the outer circumferential wall portion 26b plays a role of a pressure-receiving surface.

Incidentally, the downstream end portion (the outlet) of the combustor inner cylinder 10 has a diameter smaller than that of the upstream end portion (the inlet) of the tail cylinder 12. When the combustor is assembled, the downstream end portion of the combustor inner cylinder 10 is inserted into the upstream end portion of the tale cylinder 12. In this case, a leaf spring 30 is installed on the downstream end portion of the outer circumferential surface of the combustor inner cylinder 10. A clearance between the combustor inner cylinder 10 and the tail cylinder 12 is sealed by the leaf spring 30.

4. Operation

A description is given of a flow of air, i.e., a working medium in the gas turbine. Air 100 is compressed by the compressor 1 to become high-pressure compressed air 101. This high-pressure compressed air 101 is bled from the tail cylinder housing portion 7b via the bleeding port 13. The compressed air 102 thus bled is heated in the regenerator 4 through heat exchange with exhaust gas 106 from the turbine 3 to become high-temperature compressed air 103. The high-temperature compressed air 103 is injected into the liner housing portion 7a via the injection port 14. The high-temperature compressed air 103 fills in the liner housing portion 7a, passes through an approximately annular passage between the flow guide 11 and the combustion inner cylinder 10 and flows in the axial direction of the combustor inner cylinder 10 from the downstream side toward the upstream side.

A portion 104 of the high-temperature compressed air 103 flowing through the approximately annular passage between the flow guide 11 and the combustor inner cylinder 10 flows into the combustion chamber from cooling holes provided in a circumferential barrel portion of the combustor inner cylinder 10 and is used for the film cooling of the combustor inner cylinder 10. The remainder of the high-temperature compressed air 103 flows into the combustion chamber from combustion holes provided in the combustor inner cylinder 10 and air holes provided in the fuel nozzle 9 and is burnt together with fuel 200 jetted from the fuel nozzle 9. The combustion gas 105 thus generated in the combustion chamber is supplied to the turbine 3 through the tail cylinder 12 to provide rotative power to the turbine 3. Low-pressure exhaust gas 106 which has given the rotative power to the turbine 3 is led to the regenerator 4 in which the heat of the low-pressure exhaust gas 106 is recovered and the low-pressure exhaust gas 106 is discharged as an exhaust gas 107.

5. Comparative Example

Figure 5:
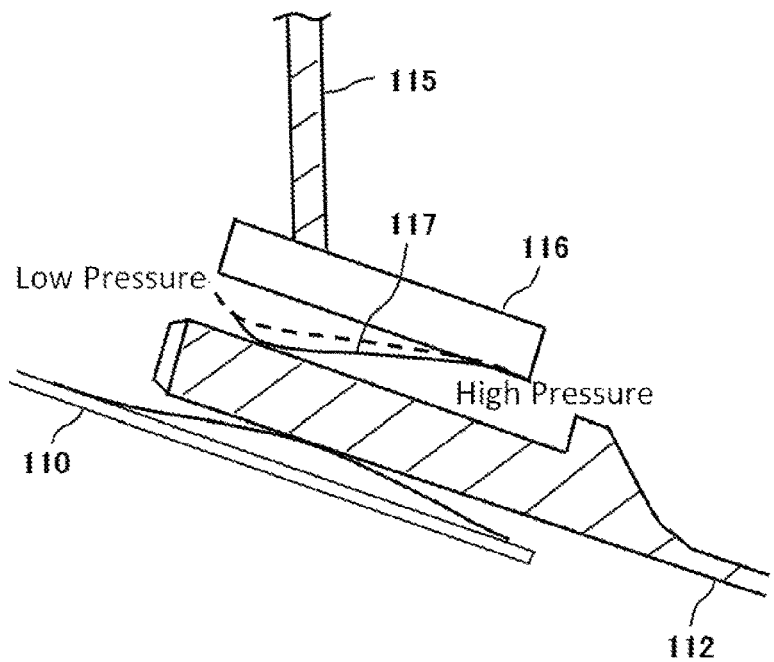
FIG. 5 illustrates a sealing mechanism for a division wall of a combustor according to a comparative example, corresponding to FIG. 2.

FIG. 5 illustrates a sealing mechanism for the division wall of a combustor according to a comparative example, corresponding to FIG. 2.

In the configuration exemplified in FIG. 5, a bracket 116 is installed on the inner circumferential portion of a division wall 115. In addition, a clearance between the bracket 116 and a tail cylinder 112 is sealed by a leaf spring 117. The leaf spring 117 has a downstream portion attached to the bracket 116 side and an upstream portion pressed against the outer circumferential surface of the tail cylinder 112 by spring force.

However, compressed air on the downstream side of the leaf spring 117 is higher in pressure than that on the upstream side. Therefore, a pressure difference therebetween is exerted in such a direction as to resist the spring force of the leaf spring 117. Because of the pressure difference, therefore, the leaf spring 117 may come away from the tail cylinder 112 (see a dotted line in FIG. 5), so that the compressed air can leak.

Figure 6:
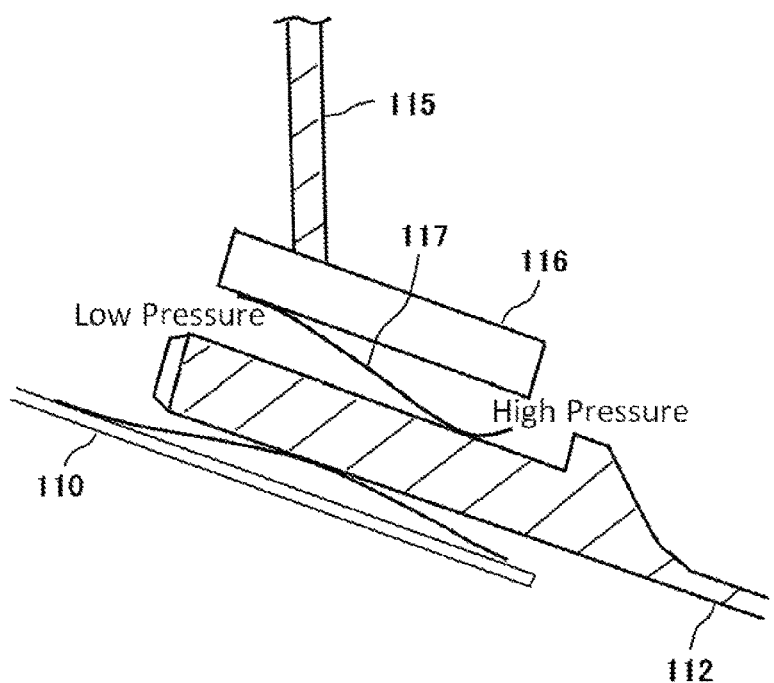
FIG. 6 illustrates a sealing mechanism for a division wall of a combustor according to another comparative example, corresponding to FIG. 2.

FIG. 6 illustrates a sealing mechanism for the division wall of a combustor according to another comparative example, corresponding to FIG. 2.

In the configuration exemplified in FIG. 6, a leaf spring 117 has an upstream portion attached to the bracket 116 side and a downstream portion pressed against the outer circumferential surface of the tail cylinder 112 by spring force. Unlike the comparative example illustrated in FIG. 5, anteroposterior differential pressure is exerted in such a direction as to press the leaf spring 117 against the tail cylinder 112 during the operation of the turbine.

Figure 7:
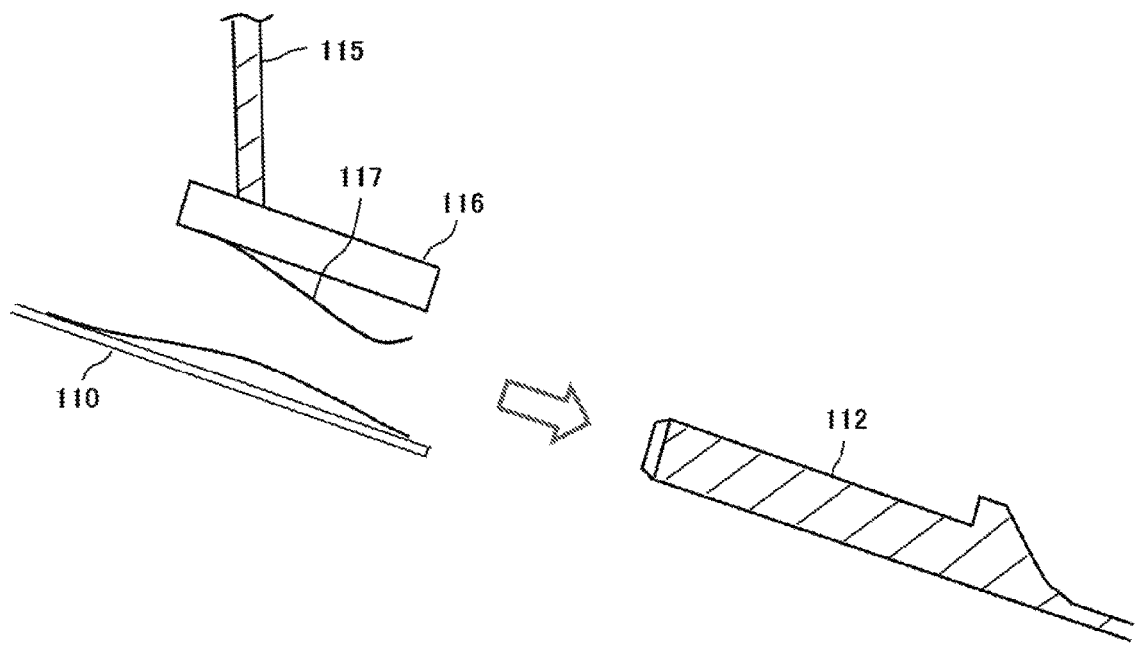
FIG. 7 illustrates the state of assembling a combustor according to another comparative example.
Figure 8:
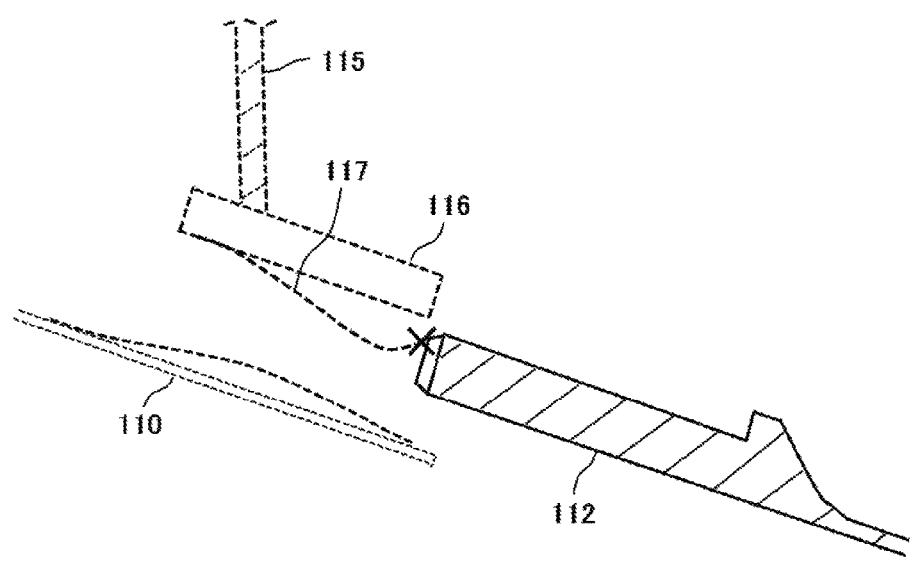
FIG. 8 illustrates the state of assembling a combustor according to another comparative example.

However, at the time of assembling the combustor, the combustor inner cylinder 110 assembled to the liner housing portion is inserted into the tail cylinder 112 assembled to the main body casing side along with the tail cylinder housing portion as illustrated in FIG. 7. In this case, the tail cylinder 112 must be designed so as to be inserted between the leaf spring 117 and the combustor inner cylinder 110. In the configuration of FIG. 6, however, the leaf spring 117 broadens in such a direction as to narrow a clearance between the combustor inner cylinder 110 and the leaf spring 117 at the time before the assembly of the combustor. In addition, the leaf spring 117 has a leading end facing the tail cylinder 112. Therefore, the leading end of the leaf spring 117 comes into contact with the end face of the tail cylinder 112. Thus, it is difficult to assemble the combustor. During the assembly of the combustor, if the insertion work of the combustor inner cylinder 110 is continued with the leading end of the leaf spring 117 remaining caught by the end face of the tail cylinder 112, then the leaf sprig 117 may be damaged.

6. Effects

On the other hand, for the sealing mechanism of the present embodiment, the seal rings 17a-17c will not fall out in such a direction as to narrow the clearance between the combustor inner cylinder 110 and the seal rings 17a-17c before the assembly of the combustor. Therefore, the following event is unlikely to occur during the assembly of the combustor. For example, the seal rings 17a-17c are caught and damaged by the tail cylinder 12. In addition, unlike the leaf spring, the enlargement of a leak path 31 of the compressed air due to the elastic deformation of the seal rings 17a-17c resulting from the differential pressure will not occur. In this case, the gaps 20 are provided on the outer circumferential side of the seal rings 17a-17c. Therefore, it is permitted that the seal rings 17a-17c are deformed along the gaps 20 while following the radial thermal deformation (expansion) of the tail cylinder 12 during the operation of the turbine. Needless to say, also the axial thermal deformation of the tail cylinder 12 is permitted. In this way, the amount of leakage of the low-temperature compressed air 102 before preheating to the high-temperature compressed air after the preheating can be reduced. Thus, the sealing mechanism of the present embodiment can contribute to an improvement in the combustion efficiency of the regenerative gas turbine combustor.

In the present embodiment, the seal rings 17a-17c are formed with the respective cuts 24; therefore, they easily broaden while following the radial thermal deformation of the tail cylinder 12 during the operation of the turbine. Consideration is given to the sealing mechanism so as to deal more flexibly with the thermal expansion of the tail cylinder 12. In the present embodiment, the seal rings 17a-17c are provided with the respective cuts 24 which can serve as leak paths. A plurality of (three) the seal rings 17a-17c are designed to be rowed so that the positions of the cuts 24 of the seal rings 17a-17c may not overlap each other when viewed from the axial direction. Thus, it is possible to suppress the leakage of the compressed air 101 through the cuts 24.

Leak paths for the compressed air 101 in the sealing mechanism are conceivably the leak path 31 on the inner circumferential side (between the seal rings 17a-17c and the tail cylinder 12) of the seal rings 17a-17c as well as a leak path 32 on the outer circumferential side of the seal rings 17a-17c. The compressed air 101 has higher pressure than the compressed air 102. For the leak path 31, therefore, the seal rings 17a-17c are pressed against the tail cylinder 12, which makes it possible to more improve a seal effect. On the other hand, the present embodiment is configured such that the outer circumferential wall portion 26b of the holder 16 are subjected to the pressure of the compressed air 101 in a radially inward direction at a position on the radially outside of the seal rings 17a-17c. Thus, the pressing force of the seal rings 17a-17c can effectively be exerted on the tail cylinder 12.

Incidentally, an amount of leakage through the leak path 32 is largely influenced by the gap of the leak path 33 between the front wall portion 26a of the holder 16 and the seal ring 17a. To reduce such an influence in the present embodiment, the seal rings 17a-17c and the spacers 18a, 18b are pressed against the holder 16 by means of the pressing force adjusting bolt 19. This can reduce the gap between the front wall portion 26a and the seal ring 17a, thereby reducing the amount of leakage through the leak path 33.

Second Embodiment

Figure 4:
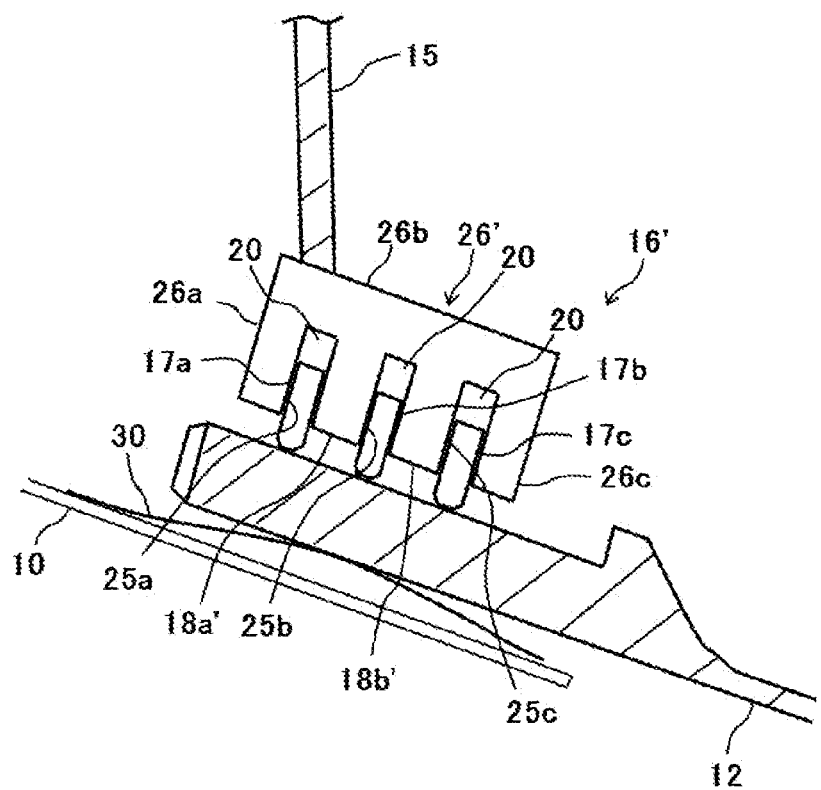
FIG. 4 is a side cross-sectional view of the configuration of a sealing mechanism according to a second embodiment of the present invention, corresponding to FIG. 2.

FIG. 4 is a side cross-sectional view illustrating the configuration of a sealing mechanism according to a second embodiment of the present invention, corresponding to FIG. 2. The constitutional members that have already been described are attached with the same reference numerals as those in FIGS. 1 to 3 and their explanations are omitted.

As illustrated in FIG. 4, the sealing mechanism according to the present embodiment is different from that according to the first embodiment in that a holder body 26' of a holder 16' which holds the seal rings 17a-17c is formed integrally with spacer portions 18a', 18b'. The holder body 26' and the spacer portions 18a' and 18b' correspond to the holder body 26 and the spacers 18a and 18b, respectively. The holder body 26' does not have the pressing force adjusting mechanism 27 (see FIG. 2). The holder body 26' is formed like a comb taken along cross-section (illustration in FIG. 4) including the central axis of the tail cylinder 12. A ring groove 25a is formed between the front wall portion 26a and the spacer portion 18a'. A ring groove 25b is formed between the spacer portion 18a' and the spacer portion 18b'. A ring groove 25c is formed between the spacer portion 18b' and the rear wall portion 26c. The other configurations are the same as those in the first embodiment.

The first embodiment exemplifies the configuration in which the member for the spacers 18a, 18b is different from that for the holder body 26. If the pressing force adjusting mechanism 27 (see FIG. 2) adapted to adjust the pressing force of the seal rings 17a-17c is omitted, the spacer portions 18a', 18b' may be configured integrally with the holder body 26 as in the present embodiment. Also the present embodiment can produce substantially the same effects as those of the first embodiment. Although the pressing force adjusting mechanism 27 is omitted, the spacers 18a', 18b' are formed integrally with the holder body 26'. Thus, the leakage of compressed air through the leak path on the outer circumferential side of the seal rings 17a-17c is not likely to occur.

(Others)

With reference to FIGS. 2 and 4, the exemplification is described in which the gap between the division wall 15 and the tail cylinder 12 is sealed by the sealing mechanism of the present invention. However, a configuration is conceivable in which for example, the gap between the division wall 15 and the combustor inner cylinder 10 is sealed. In this case, workability encountered when the combustor inner cylinder 10 is inserted into the tail cylinder 12 can be improved. The configuration in which the division wall 15 is mounted on the liner housing portion 7a is described by way of example. However, for example, a configuration may be conceivable in which the division wall 15 is held between the liner housing portion 7a and the tail cylinder housing portion 7b.

Alternatively, a configuration may be conceivable in which the division wall 15 may be mounted on the tail cylinder housing portion 7b.

The configuration in which the seal rings 17a-17c have the respective cuts 24 is described by way of example. However, even if the seal rings 17a-17c do not have the respective cuts 24, they may flexibly deform following the expansion of the tail cylinder 12 owing to their material, size (thickness, diameter or the like), a sectional shape and the like. In such a case, the cuts 24 of the seal rings 17a-17c can be omitted.

The installation of the three seal rings 17a-17c is described by way of example. However, the number of the seal rings may be two or less, or four or more. If the number of the seal rings is increased, it is generally expected that the sealing effect is improved.

A description is given of the case where the regenerative gas turbine combustor provided with the sealing mechanism according to the present invention is applied to the gas turbine for power generation. However, it is conceivable that for example, a pump or the like as load equipment in place of the generator 5 may be connected to the turbine.

What is claimed is:

1. A regenerative gas turbine combustor, comprising:
   a combustor inner cylinder internally defining a combustion chamber;
   a tail cylinder connecting the combustor inner cylinder with a turbine;
   a combustor outer cylinder surrounding the combustor inner cylinder and the tail cylinder;
   a fuel nozzle for supplying fuel to the combustion chamber;
   a bleeding port provided in the combustor outer cylinder;
   a regenerator for preheating, by using the exhaust gas from the turbine, compressed air bled from the bleeding port;
   an injection port for injecting the compressed air bled preheated by the regenerator into the inside of the combustor outer cylinder;
   a division wall for blocking a compressed-air passage located between the combustor inner cylinder and the tail cylinder, and the combustor outer cylinder, at a position between the bleeding port and the injection port; and
   a sealing mechanism for sealing a clearance between the tail cylinder or the combustor inner cylinder and the division wall;
   wherein the sealing mechanism includes a plurality of seal rings, a holder installed on an inner circumferential portion of the division wall and having a ring groove for holding the plurality of seal rings, and a gap provided between an inner circumferential surface of the ring groove and an outer circumferential surface of the plurality of seal rings;
   wherein the plurality of seal rings are in contact with an outer circumferential surface of the tail cylinder and each has one cut at a circumferential position thereof;
   wherein the plurality of seal rings are provided in the axial direction of the tail cylinder and the cut positions of the plurality of seal rings adjacent to each other are offset from each other;
   wherein the holder includes a holder body having a front wall portion whose section extends in a radial direction of the tail cylinder and an outer circumferential wall portion which extends from an outer circumferential portion of the front wall portion toward a downstream side, a spacer interposed between the plurality of seal rings adjacent to each other and defining the ring groove, and a pressing force adjusting mechanism for adjusting the pressing force of the plurality of seal rings and the spacer against the holder body; and
   wherein the pressing force adjusting mechanism includes a bracket which is secured to the downstream end of the outer circumferential wall portion, a pressing ring which sandwiches a plurality of seal rings having the spacer interposed therebetween in cooperation with the front wall portion, and a pressing force adjusting bolt that threadedly engages with the bracket so as to adjust a pressing force of the plurality of seal rings and the spacer against the holder body via the pressing ring.

2. A gas turbine, comprising:
   the regenerative gas turbine combustor according to claim 1;
   a compressor for supplying compressed air bled to the regenerative gas turbine combustor; and
   a turbine driven by combustion gas from the regenerative gas turbine combustor.

3. The regenerative gas turbine combustor according to claim 1,
   wherein the holder has an outer circumferential surface as a pressure-receiving surface projecting from the division wall toward the bleeding port side.

* * * * *